United States Patent
Wang (10) Patent No.: US 7,056,364 B2
(45) Date of Patent: Jun. 6, 2006

(54) SECURING SEAT FOR HOLDING FILTERING CYLINDER OF A DUST COLLECTOR

(76) Inventor: Chun Hsiang Wang, P.O. Box 82-144, Taipei (TW)

( * ) Notice: Subject to any disclaimer, the term of this patent is extended or adjusted under 35 U.S.C. 154(b) by 251 days.

(21) Appl. No.: 10/735,762

(22) Filed: Dec. 16, 2003

(65) Prior Publication Data

US 2005/0126137 A1 Jun. 16, 2005

(51) Int. Cl.
*B01D 46/02* (2006.01)
(52) U.S. Cl. .......................... 55/498; 55/493; 55/495; 55/502; 55/505; 55/507; 55/510; 55/521; 210/232
(58) Field of Classification Search .................. 55/378, 55/490, 493, 495, 498, 500, 502, 505, 503, 55/507, 510, 521; 210/172, 232, 483, 493.2, 210/493.5, 495, 497.01
See application file for complete search history.

(56) References Cited

U.S. PATENT DOCUMENTS

| | | | | |
|---|---|---|---|---|
| 2,273,210 A | * | 2/1942 | Lowther et al. ............... | 55/505 |
| 4,445,915 A | * | 5/1984 | Robinson ...................... | 55/502 |
| 5,209,845 A | * | 5/1993 | Sims ............................ | 55/502 |
| 5,660,608 A | * | 8/1997 | Bartholome .................. | 55/498 |
| 6,319,298 B1 | * | 11/2001 | Ng-Gee-Quan .............. | 55/521 |
| 6,527,839 B1 | * | 3/2003 | Fornof et al. ................. | 55/510 |
| 6,833,023 B1 | * | 12/2004 | Vandenberghe et al. ...... | 55/498 |
| 2004/0003719 A1 | * | 1/2004 | Le et al. ....................... | 55/498 |
| 2004/0065206 A1 | * | 4/2004 | Walker, Jr. .................... | 55/498 |

* cited by examiner

*Primary Examiner*—Jason M. Greene
(74) *Attorney, Agent, or Firm*—Leong C. Lei (57) ABSTRACT

A securing seat for holding filtering cylinder of a dust collector is disclosed. The securing seat includes a binding mount and a binding belt, and the middle section of the inner edge of the binding mount is protruded with an inverted L-shaped holding plate. The top face of the binding mount is an engaging slot for engagement with a filtering cylinder. The top edge and the bottom edge at the inner face of the binding mount and the holding plate are respectively formed into lid and fastening slot. The filtering cylinder is mounted to the engaging slot and the lid and the fastening slot are adhered to each other. Thus, the securing seat is provided with excellent air tightness and the securing seat is firmly secured, and the air suction of the dust collector is improved.

4 Claims, 9 Drawing Sheets

SECURING SEAT FOR HOLDING FILTERING CYLINDER OF A DUST COLLECTOR

BACKGROUND OF THE INVENTION (a) Technical Field of the Invention

The present invention relates to filtering cylinder of a dust collecting device, and in particular, a securing seat for holding a filtering cylinder of the dust collector employing a binding mount having engaging slot to be mounted with lid structure.

(b) Description of the Prior Art

Figure 1:
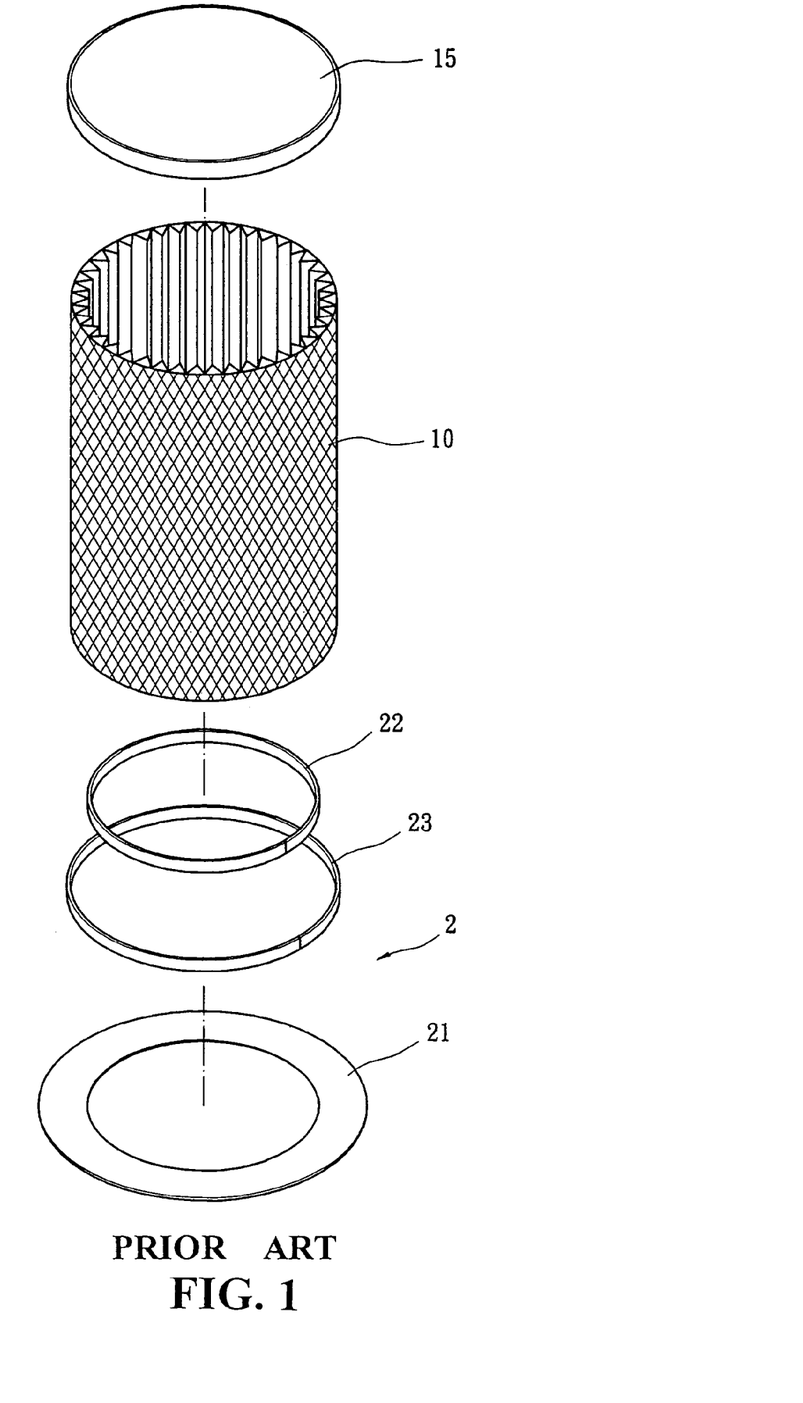
FIG. 1 is a perspective exploded view of a conventional securing seat of a filtering cylinder.
Figure 2:
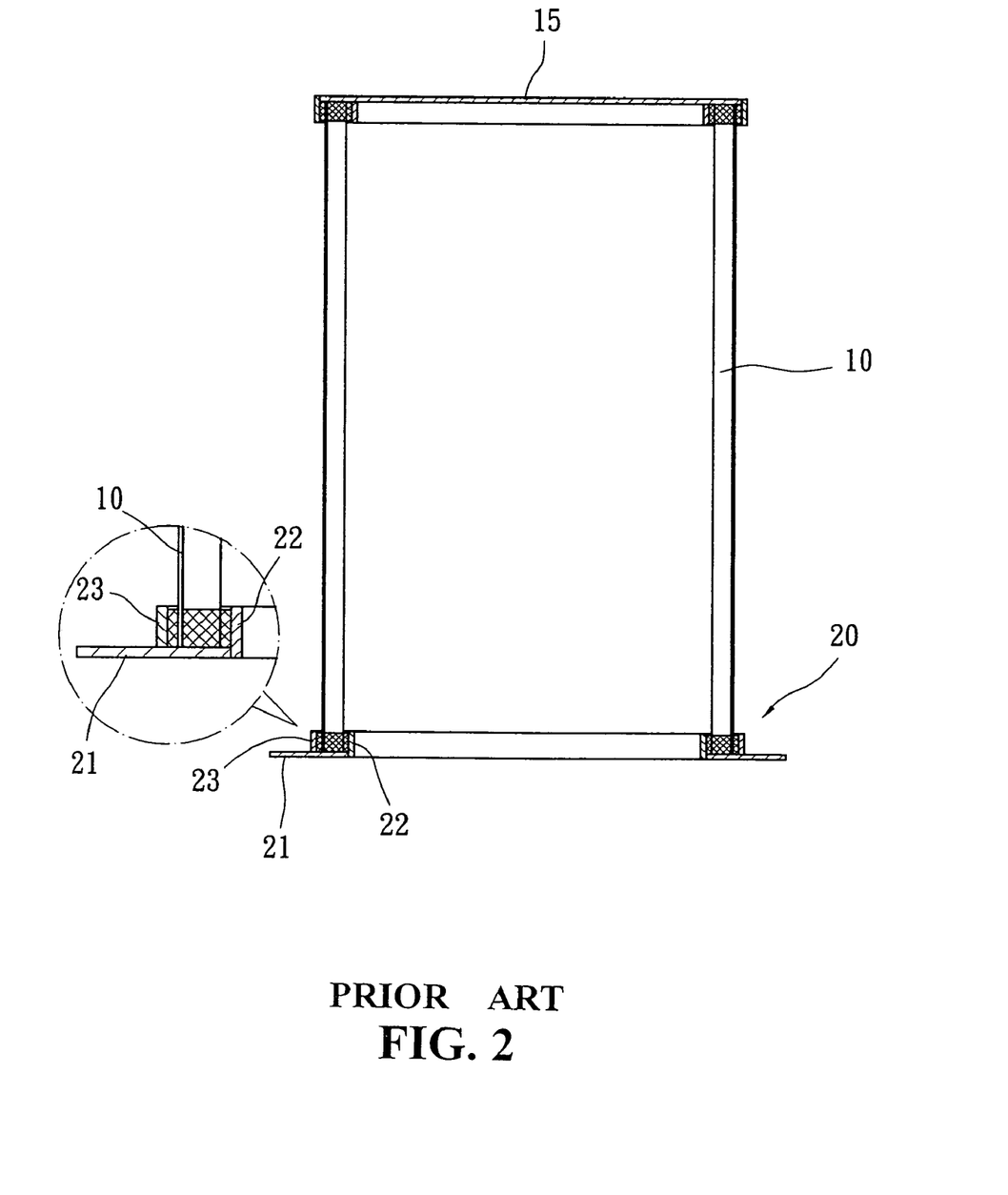
FIG. 2 is a schematic sectional view of the conventional securing seat.
Figure 3:
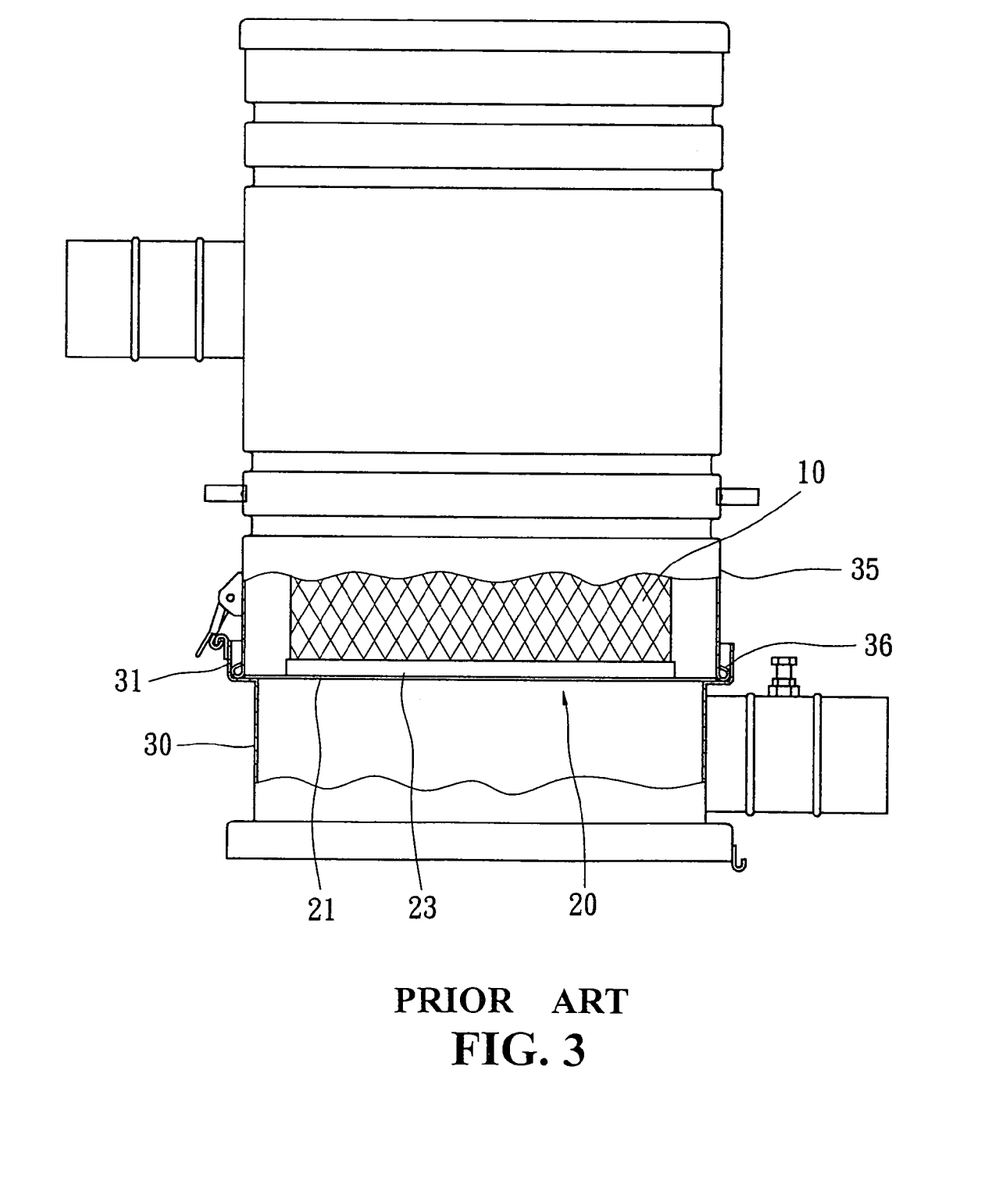
FIG. 3 is a sectional view of a conventional securing seat and seat body.

Dust collector or dust collecting device employs a blower to vibrate surrounding air so that any dust particles in the air is filtered or cleaned. This device is commonly used in saw mills or furniture factories to filter debris or dust at the surrounding of the environment. The blower generates suction and the air is filtered at the filtering cylinder of the loop. As a result of that the tightness or sealing of the loop in the filtering process is important because the effectiveness of filtering or of dust collection is directly affected if there is a leakage in the loop. Conventional securing seat for filtering cylinder has drawbacks with respect to air sealing or seat securing. As shown in FIG. 1 or 2, there is shown a securing seat 20 holding the bottom end of the filtering cylinder 10 with a cylinder cap 15 at the top end thereof. The securing seat 20 has a circular bottom plate 21 with an upper edge mounted with an inner circular mount 22, and the surface of the bottom plate 21 at the exterior of the inner circular mount 22 is an outer circular mount 23. There is an engaging slot between the inner and outer circular mount 22, 23 for engagement with the bottom end of the filtering cylinder 10. The bottom plate 21, the inner circular mount 22 and the outer circular mount 23 are made from metallic plate. In the course of manufacturing these components, the yield is poor and the production is slow. Further, the metallic plates are heavy and the cost of product is high. The third drawback is that the air tightness is poor, and this is because when the filtering cylinder 10 is placed onto the securing seat 20, an adhesive is employed at the gap between the outer and the inner circular mount 22, 23. The adhesion between the inner circular mount 22 and the outer circular mount 23 is poor. After a period of application, the vibration during the operation and the force due to expansion and contraction will cause the adhesion between the inner circular mount 22 and the outer circular mount 23 and therefore, there is a leakage occurred. Due to the fact that the bottom plate 21 is a metallic material, when the plate 21 is mounted onto the holding section 31 of the cylinder seat 30 and then is pressed by the folded edge 36 of the cylinder body 35 (as shown in FIG. 3, it is a contact between two rigid material. Therefore, air tightness is poor. In view of the above, the seat body 20 of the filtering cylinder 10 is an inappropriate design.

Figure 4:
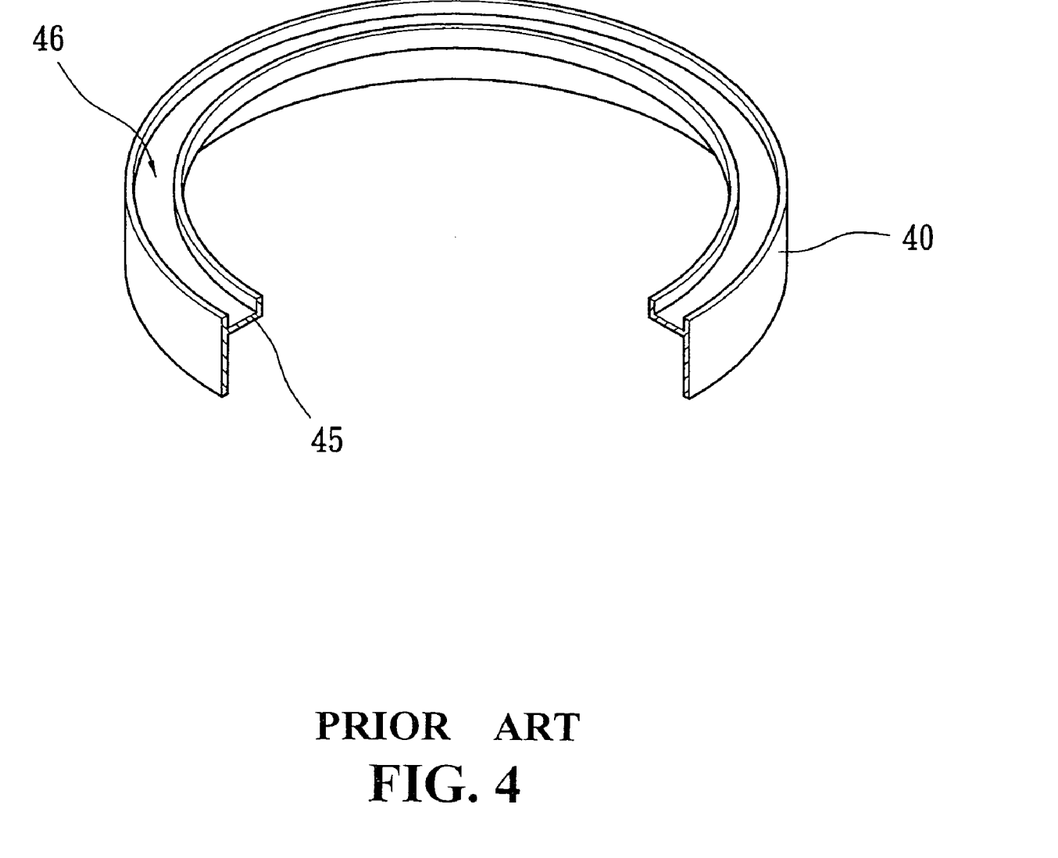
FIG. 4 is a perspective view of another conventional securing seat.
Figure 5:
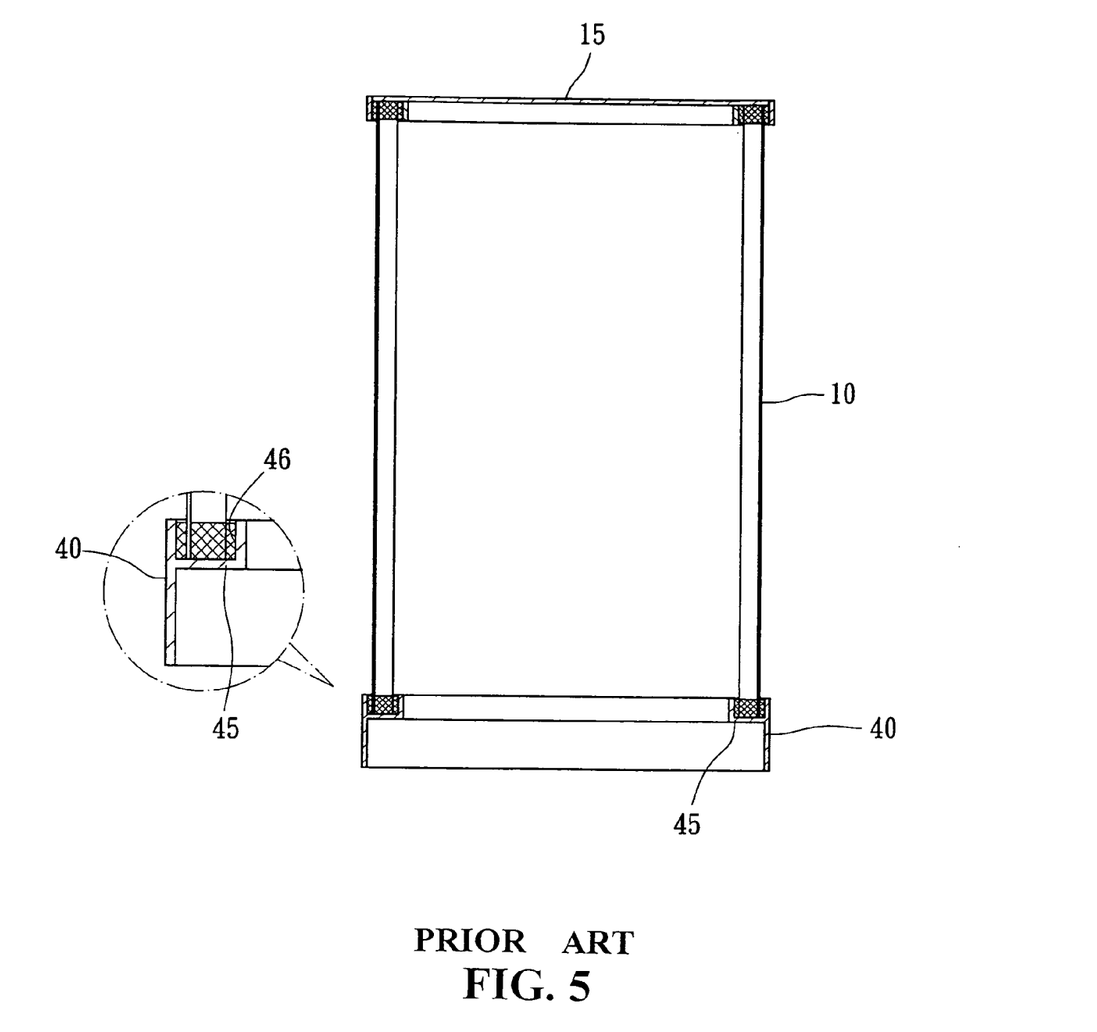
FIG. 5 is a schematic sectional view of another conventional securing seat of the filtering cylinder.
Figure 6:
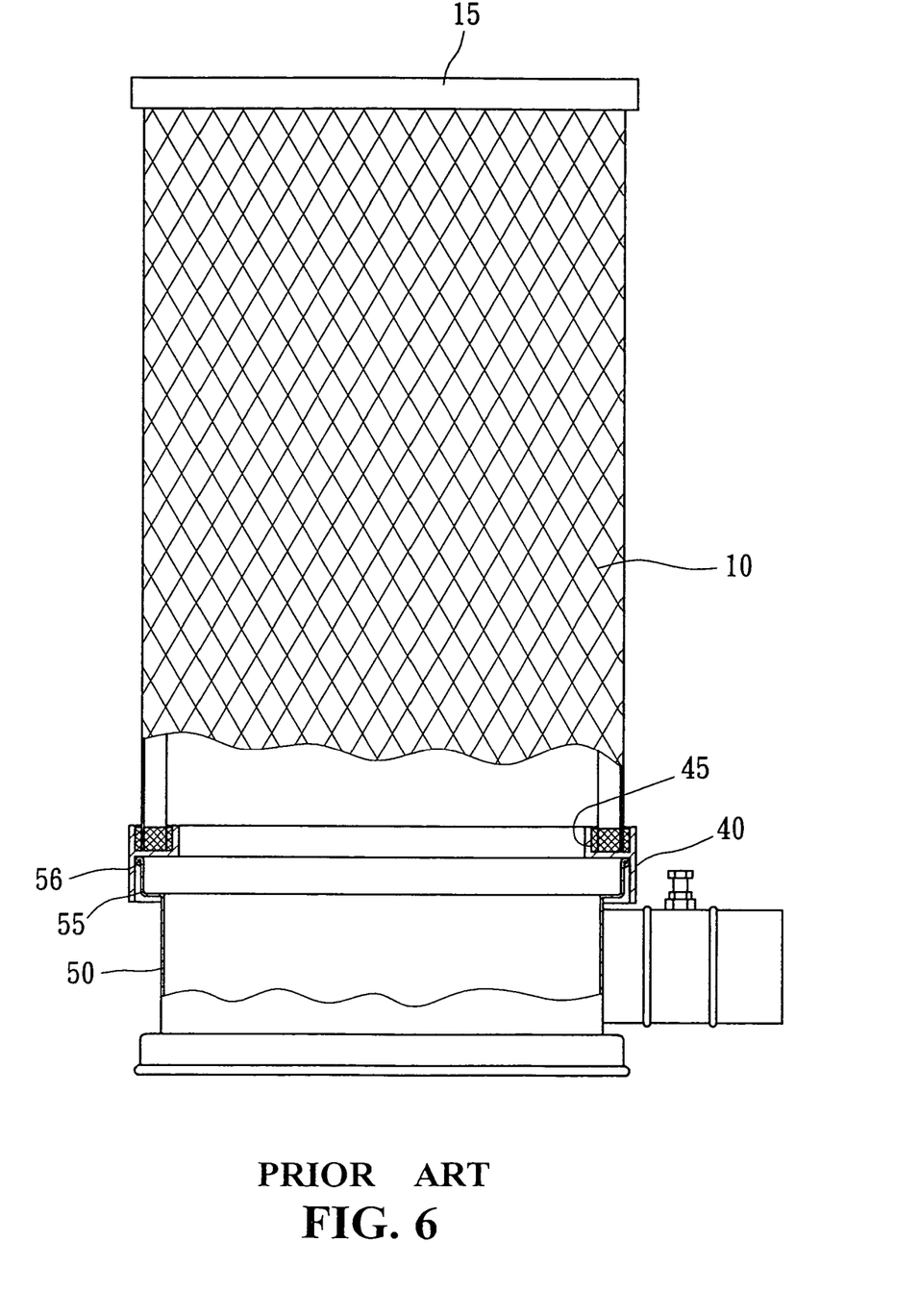
FIG. 6 is a sectional view of another conventional securing seat and the seat body.

FIGS. 4, 5, and 6 show another conventional securing seat for a filtering cylinder. The securing seat 40 is made from soft plastic material and the inner edge of the securing seat 40 is protruded with an inverted L-shaped holding plate 45 so that the top face of the securing seat 40 has an engaging slot 46 for holding the filtering cylinder 10, as shown in FIG. 5. Thus, the filtering cylinder 10 can be mounted onto the cylinder seat 50 having an extended holding section 55 via the securing seat 40, as shown in FIG. 6.

The use of plastic material solves the problems due to weight and cost of production. However, the different of material for the filtering cylinder 10 and the securing seat 40, an adhesive has to be applied at the interior of the engaging slot 46. But the adhesion between the securing seat 40 and the holding plate 45 is poor, and similarly, after a period of application due to vibration and temperature change, the adhesive will be stripped off from the securing seat 40 and the surface of the holding plate 45 and a gap is formed. Thus the air tightness of the filtering cylinder 10 is poor. Further, the top end of the holding section 55 is provided with a folded edge 56 for safety and aesthetic reason, when the securing seat 40 is mounted onto the holding section 55, the inner edge of the securing seat 40 and the wall surface of the holding section 55 form gap, as shown in FIG. 6. Thus, the filtering cylinder 10 is unstable and this will indirectly affect the air-tightness and the efficiency of dust suction is low.

In view of the drawbacks discussed above, it is an object of the present invention to provide securing seat for holding filtering cylinder of a dust collector which mitigates the problems of air tightness of the securing seat of the filtering cylinder.

SUMMARY OF THE INVENTION

Accordingly, it is an object of the present invention to provide a securing seat for holding filtering cylinder of a dust collector comprising a binding mount and a binding belt, the binding mount being adapted for the filtering cylinder and the binding mount being mountable to the body of the filtering cylinder, characterized in that the middle section of the inner face of the binding mount is provided with a holding plate protruded as one unit, and an engaging slot is formed between the holding plate and the binding mount for engaging with the filtering cylinder, and the binding mount corresponding to the engaging slot and the top edge of the inner face of the holding plate are respectively provided with a lid, and the binding mount corresponding to the engaging slot and the bottom edge of the inner face of the holding plate are recessed fastening slot, and the inner face at the lower section of the binding mount, adjacent to the external bottom edge of the holding plate, is formed into a recessed engaging slot, and the engaging slot is for the engagement of the folded edge formed on the holding section of the cylinder body, and the binding belt binds the binding mount onto the cylinder body.

Yet another object of the present invention is to provide a securing seat for holding filtering cylinder of a dust collector, wherein the securing seat has excellent enclosure. This is because the inner surface of the binding mount 60 of the securing seat is formed into an engaging slot 63 which provides excellent securing effect. Further, the inner surface of the binding mount 60 can fully adhere to the external circumferential face of the holding section 85, and the binding of the external binding belt 70, the securing seat can be firmly secured to the cylinder body 80.

Still another object of the present invention is to provide a securing seat for holding filtering cylinder of a dust collector, wherein the securing seat has a great stability. Due to the mounting of the lids 600, 610 at the engaging slot 62 and the fastening slots 601, 611, together with the engaging hole 65, adhesive can be effectively adhere to the binding mount 60. Thus, the stability of the securing seat is greatly increased and the securing seat will not released from the filtering cylinder.

Yet another object of the present invention is to provide a securing seat for holding filtering cylinder of a dust collector, wherein the adhesive on the filtering cylinder 10 and the binding mount of the securing seat, the air tightness is greatly improved and therefore the effectiveness of dust collection is also improved.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 7:
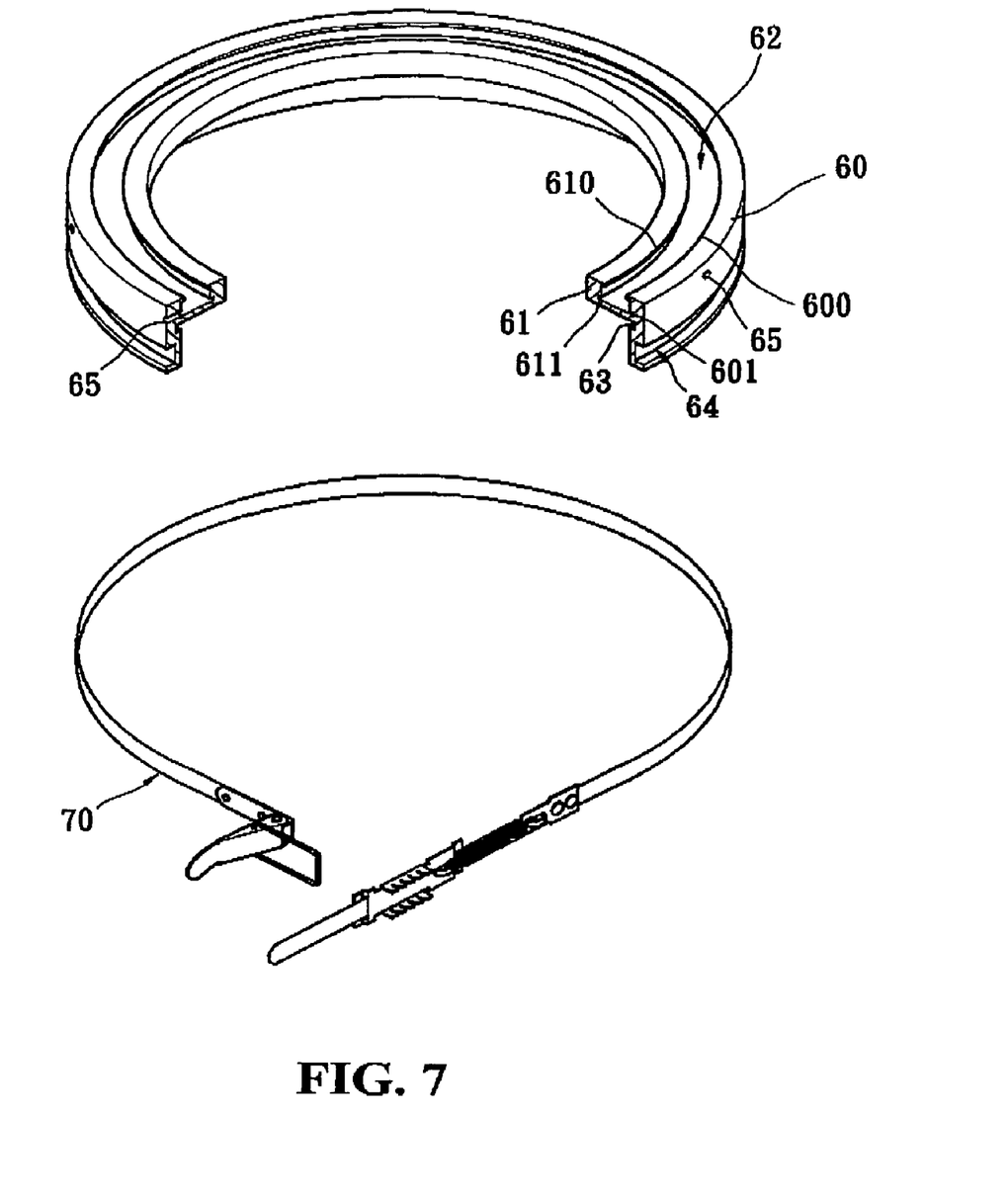
FIG. 7 is a perspective exploded view of a securing seat of the present invention.
Figure 8:
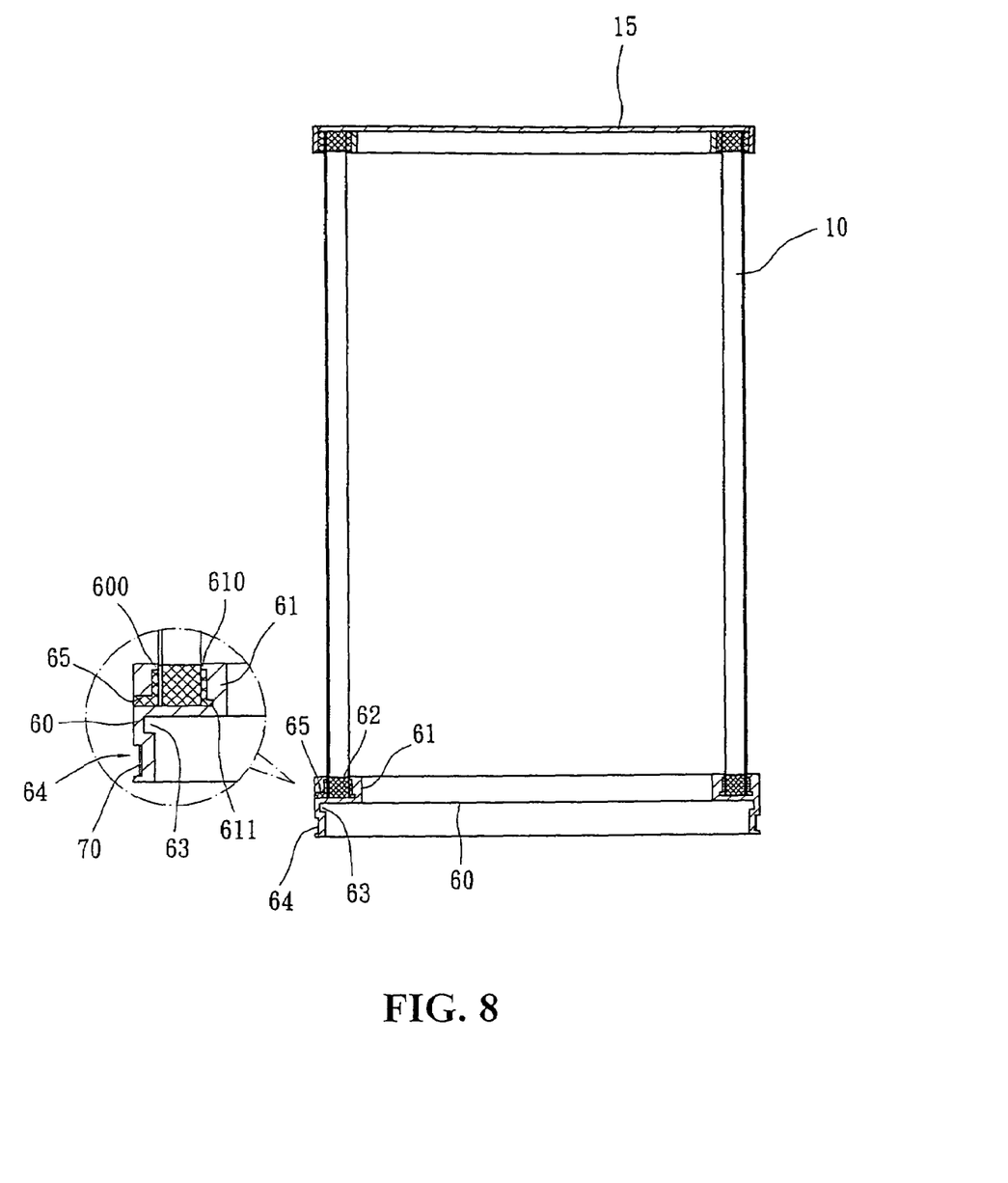
FIG. 8 is a sectional view of a securing seat of the present invention.
Figure 9:
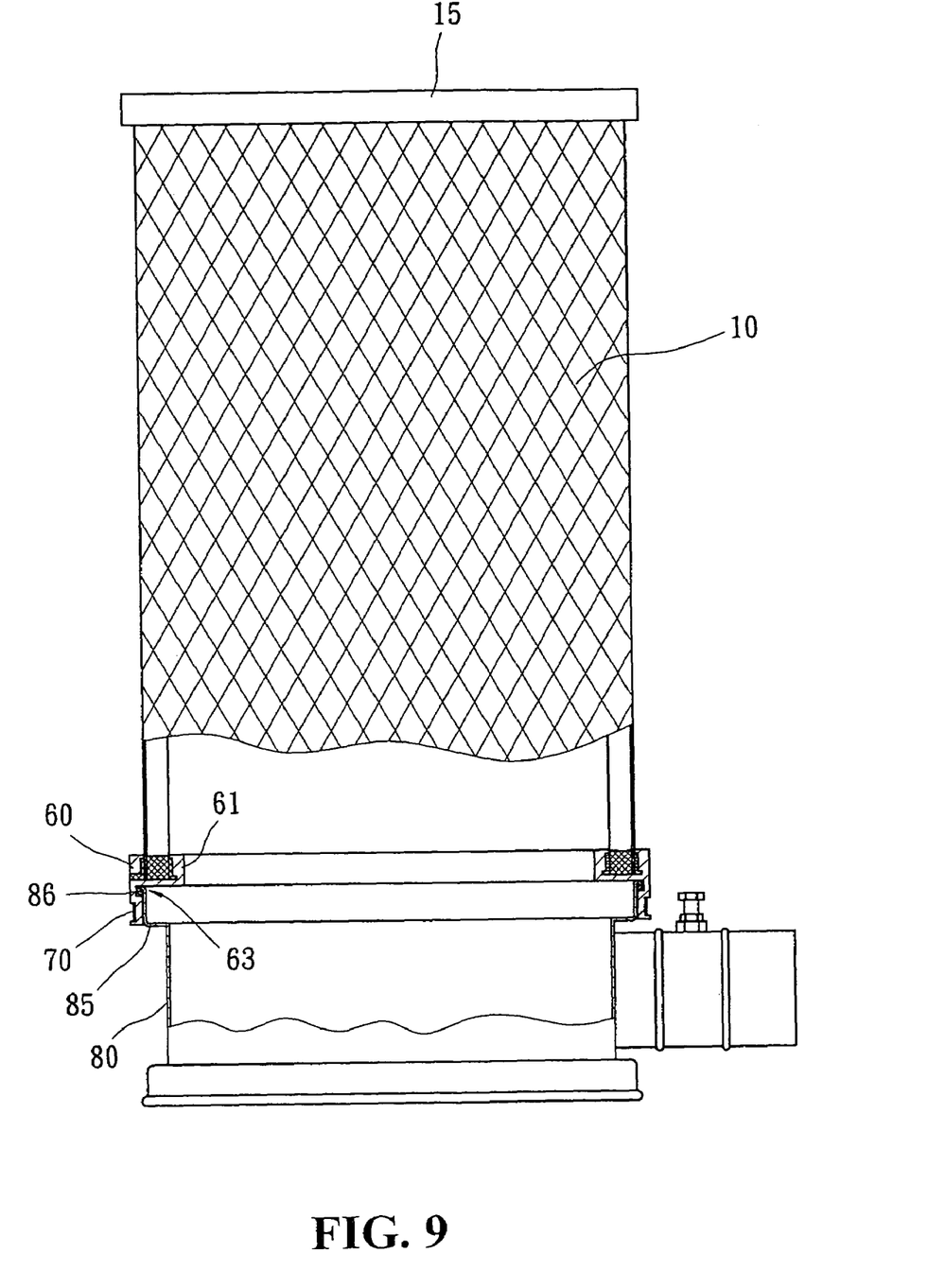
FIG. 9 is a sectional view of the securing seat and the seat body of the present invention showing the combination of the securing seat.

Referring to FIGS. 7, 8, and 9, there is shown the structure of a securing seat for a filtering cylinder of a dust collector or dust collecting device. The securing seat structure of the present invention includes a circular binding mount 60 and a binding belt 70. The binding mount 60 is employed to mount onto the cylinder body 80 having a holding section 85. The binding belt 70 is used to tightly mount the binding mount 60 onto the holding section 85 of the cylinder body 80.

FIGS. 7, 8 and 9 show the detailed structure of the securing seat of the present invention. The binding mount 60 is a soft plastic material and the middle section of the inner surface of the binding mount 60 is a holding plate 61 being L-shaped and being formed integrally as one unit.

An appropriate width engaging slot 62 is formed by the holding plate 61 and the binding mount 60 and the engaging slot 62 is adapted for mounting the bottom edge of the filtering cylinder 10. There is an appropriate gap between the engaging slot 62 and the filtering cylinder 10 so that an adhesive can be applied. Further, the binding mount 60 corresponding to the engaging slot 62 and the top edge at the inner face of the holding plate 61 are respectively provided with lids 600, 610 and the lids 600, 610 can urge the inner and outer edge face of the filtering cylinder 10. Further, the binding mount 60 of the corresponding engaging slot 62 and the bottom edge at the inner surface of the holding plate 61 are recessed to form a fastening slots 601, 611, and the circumferential face of the binding mount 60 corresponding to the engaging slot, 62 is a row of engaging hole 65, allowing adhesive to flow in so as to improve the adhesion.

The inner face at the lower section of the binding mount 60, adjacent to the external bottom edge of the holding plate 61, is formed into a recessed engaging slot 63. The slot 63 is engageable with the folded edge 86 formed at the top edge of the holding section 85 of the cylindrical body 80, as shown in FIG. 9. Further the lower section at the outer circumferential face of the binding mount 60 corresponding to the cylinder body 80 is a recessed binding slot 64. The binding slot 64 is for the engagement of the binding belt 70. The binding belt 70 is used to bind the binding mount 60 onto the cylinder body 80. Thus, an enclosed stable and air tight securing seat structure is obtained.

In application, as shown in FIGS. 8 and 9, the bottom edge of the filtering cylinder 10 is engaged with the engaging slot 62 of the binding mount 60, and an adhesive is then applied so that the adhesive flows into the engaging hole 65, and the fastening slots 601, 611.

In combination with the lids 600, 610, the combination ability of the adhesive and the binding mount 60 is greatly improved. The filtering cylinder 10 is mounted onto the holding section 85 of the cylinder body 80 by use of the binding mount 60. The folding edge 86 on the holding section 85 is mounted to the engaging slot 63 at the inner edge of the binding mount 60, and the inner face of the binding mount 60 can be fully adhered to the external circumferential face of the holding section 85 of the cylinder body 80. Finally, the binding belt 70 firmly secures the binding mount 60 onto the cylinder body 80.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A securing seat for holding a filtering cylinder of a dust collector comprising a binding mount and a binding belt, the binding mount being adapted for the filtering cylinder and the binding mount being mountable to the body of the filtering cylinder, characterized in that a middle section of an inner face of the binding mount is provided with a holding plate protruded as one unit, and an engaging slot is formed between the holding plate and the binding mount for engaging with the filtering cylinder, and a portion of the binding mount corresponding to the engaging slot and a top edge of an inner face of the holding plate are respectively provided with a lid, and the binding mount corresponding to the engaging slot and the bottom edge of the inner face of the holding plate have recessed fastening slots, and the inner face at a lower section of the binding mount, adjacent to an external bottom edge of the holding plate, is formed into a recessed engaging slot, and the recessed engaging slot is for the engagement of a folded edge formed on a holding section of a cylinder body, and the binding belt binds the binding mount onto the cylinder body.

2. The securing seat for holding a filtering cylinder of a dust collector of claim 1, wherein the lid at the inner face of the holding plate and the binding mount of the securing seat urges the inner and outer edge face of the filtering cylinder.

3. The securing seat for holding a filtering cylinder of a dust collector of claim 1, wherein the circumferential face of the binding mount of the securing seat corresponding to the engaging slot is formed with rows of engaging holes, allowing adhesive to flow into the holes.

4. The securing seat for holding a filtering cylinder of a dust collector of any one of claim 1, wherein the lower section at the external circumferential face of the binding mount of the securing seat corresponding to the cylinder body is a recessed binding slot for the engagement of the binding belt.

* * * * *